United States Patent
Mattershead

[19]

[11] Patent Number: 6,053,681

[45] Date of Patent: Apr. 25, 2000

[54] WHEEL NUT LOCKING ASSEMBLY

[76] Inventor: Dennis Mattershead, 133-52409-R.R. 223, Sherwood Park, Alta, Canada, T8A 4T4

[21] Appl. No.: 09/088,764

[22] Filed: Jun. 2, 1998

[51] Int. Cl.⁷ ..................................................... F16B 39/28
[52] U.S. Cl. ......................... 411/195; 411/14; 411/372.6; 411/374; 411/191
[58] Field of Search ..................................... 411/191, 192, 411/195–197, 429, 374, 373, 120, 119, 14

[56] References Cited

U.S. PATENT DOCUMENTS

| | | |
|---|---|---|
| 479,131 | 7/1892 | Arthur ..................................... 411/195 |
| 1,002,452 | 9/1911 | Rickards . |
| 1,241,181 | 9/1917 | Wilhelm . |
| 1,261,002 | 4/1918 | Baas ........................................ 411/196 |
| 1,567,653 | 12/1925 | Kohn . |
| 2,101,678 | 12/1937 | Herschmann . |
| 3,750,732 | 8/1973 | Moebius . |
| 4,493,597 | 1/1985 | Rolf . |
| 5,071,300 | 12/1991 | McCauley . |
| 5,120,174 | 6/1992 | Patti ........................................ 411/14 |
| 5,205,614 | 4/1993 | Wright . |
| 5,205,616 | 4/1993 | Wright . |
| 5,380,070 | 1/1995 | FitzGerald . |

FOREIGN PATENT DOCUMENTS

| | | |
|---|---|---|
| 64057 | 9/1899 | Canada . |
| 94433 | 7/1905 | Canada . |
| 113767 | 8/1908 | Canada . |
| 277098 | 1/1928 | Canada . |
| 277290 | 1/1928 | Canada . |
| 412341 | 5/1943 | Canada . |
| 494970 | 8/1953 | Canada . |
| 697314 | 11/1964 | Canada . |
| 753086 | 2/1967 | Canada . |
| 2242720 | 10/1991 | United Kingdom ..................... 411/14 |

*Primary Examiner*—Flemming Saether
*Attorney, Agent, or Firm*—Nikolai, Mersereau & Dietz, P.A.

[57] ABSTRACT

There is provided a new and improved wheel nut locking assembly for use on a wheel nut on a hub of a vehicle wheel, in which the wheel nut comprises a polygonal outer surface and a threaded inner surface which is constructed so as to engage a shaft. The shaft has a threaded portion and a non-threaded polygonal head extension with a threaded aperture therein. The assembly comprises a locking cap which has a recess adapted to receive the wheel nut in one of a plurality of orientations in a rotationally locked arrangement relative to the shaft. There is also provided an aperture which is adapted to receive and engage the polygonal head extension so as to prevent rotation of the locking cap and the wheel nut relative to the shaft.

10 Claims, 2 Drawing Sheets

WHEEL NUT LOCKING ASSEMBLY

FIELD OF THE INVENTION

This invention relates to a wheel nut locking assembly for use on the wheel nut on the hub of a vehicle wheel.

BACKGROUND OF THE INVENTION

On highway transport trucks and trailers there are wheels that are bolted in place. There have been truck and trailer wheels and wheel assemblies accidentally detaching from the moving vehicle. Once detached the wheels or assemblies will travel unrestricted causing property damage, injury or death.

The wheel nuts holding the wheels on the hubs of the vehicles are subject to stress and vibration which tends to loosen the nuts which in turn increases the risk that the wheel assembly may detach from the moving vehicle. There is thus required a means of positively locking the wheel nuts in place which accounts for the normal stresses exerted upon the nuts. Further, a means of locking the nuts which provides the vehicle operator with a means to check that the nuts have not substantially loosened or cracked would be beneficial in the day-to-day operation of such vehicles.

Attempts in the prior art to solve these problems have thus far proven unsuccessful or incomplete. For example, the applicant is aware of U.S. Pat. No. 4,493,597 of Rolf, issued Jan. 15, 1985 and U.S. Pat. No. 1,002,452 of Rickards, issued Sep. 5, 1911 which each describe a nut locking or attaching assembly. However, neither reference teaches a means of positively locking the wheel nut in more than one location so as to provide a positive lock which will resist the stresses and vibrations exerted upon the nut. Further, neither reference provides a means for the vehicle operator to quickly check the locking assemblies to ensure that the nuts have not loosened at all.

Also of general background interest are: U.S. Pat. No. 1,241,181 of Wilhelm, issued Sep. 25, 1917; U.S. Pat. No. 1,567,653 of Kohn, issued Aug. 27, 1923; U.S. Pat. No. 2,101,678 of Herschmann, issued Dec. 7, 1937; U.S. Pat. No. 3,750,732 of Moebius, issued Aug. 7, 1973; U.S. Pat. No. 5,071,300 of McCauley, issued Dec. 10, 1991; U.S. Pat. No. 5,205,614, issued Apr. 27, 1993 and U.S. Pat. No. 5,205,616, issued Apr. 27, 1993, both of Wright; U.S. Pat. No. 5,380,070 of FitzGerald, issued Jan. 10, 1995; Canadian Patent 64,057 of Larew, issued Sep. 27, 1899; Canadian Patent 94,433 of McComb, issued Jul. 24, 1905; Canadian Patent 113,767 of Parker, issued Aug. 25, 1908; Canadian Patent 277,098 of Brown, issued Jan. 17, 1928; Canadian Patent 277,290 of McCutcheon, issued Jan. 24, 1928; Canadian Patent 412,341 of Jones, issued May 11, 1943; Canadian Patent 494,970 of Koza, issued Aug. 4, 1953; Canadian Patent 697,314 of Perry, issued Nov. 10, 1964; and Canadian Patent 753,086 of Simmonds et al., issued Feb. 21, 1967.

SUMMARY OF THE INVENTION

It is therefore an object of the invention to provide a wheel nut locking assembly for use in positively locking the wheel nut on the hub of a vehicle wheel.

In one aspect of the invention, there is provided a wheel nut locking assembly for use on a wheel nut on a hub of a vehicle wheel, in which the wheel nut comprises a polygonal outer surface and a threaded inner surface which is constructed so as to engage a shaft. The shaft has a threaded portion and a non-threaded polygonal head extension with a threaded aperture therein. The assembly comprises a locking cap which has a recess adapted to receive the wheel nut in one of a plurality of orientations in a rotationally locked arrangement relative to the shaft. There is also provided an aperture which is adapted to receive and engage the polygonal head extension so as to prevent rotation of the locking cap and the wheel nut relative to the shaft.

In another aspect of the invention, there is provided an indicator means to signal movement of the shaft relative to the hub.

In another aspect of the invention, the recess comprises a plurality of internal grooves to receive the polygonal outer surface of the nut in the rotationally locked arrangement.

In another aspect of the invention, the aperture comprises a plurality of internal grooves to receive and engage the polygonal head extension of the shaft so as to prevent rotation of the locking cap and the wheel nut relative to the shaft.

In another aspect of the invention, the indicator means comprises a hemispherical cap having an indicating device readily visible to a user of the assembly and constructed so as to abut the locking cap and releasably engage the locking cap and the shaft.

BRIEF DESCRIPTION OF THE DRAWINGS

These and other advantages of the invention will become apparent upon reading the following detailed description and upon referring to the drawings in which.

Figure 1:
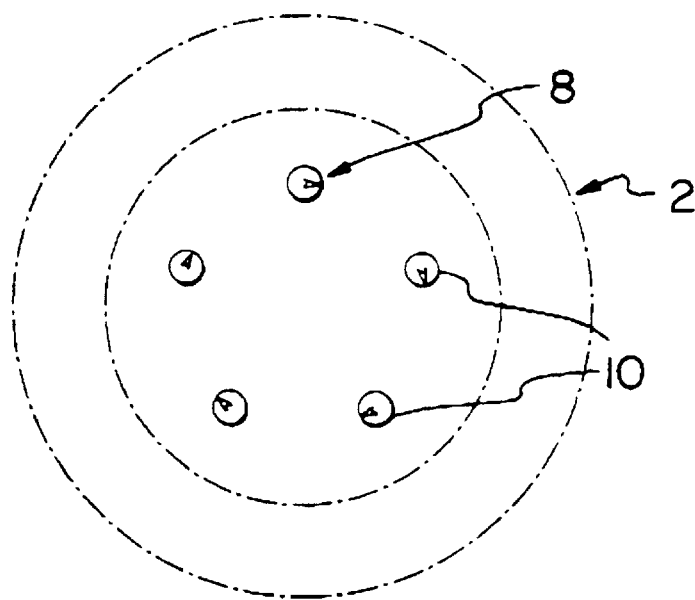
FIG. 1 is a front elevation view of a vehicle wheel incorporating the assembly of the present invention.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description, similar features in the drawings have been given similar reference numerals.

Turning to the drawings, there is illustrated a vehicle wheel 2 having a plurality of hub assemblies, and held in place by wheel nuts 8, shown engaged within a locking assembly 10 in accordance with the present invention.

Figure 2:
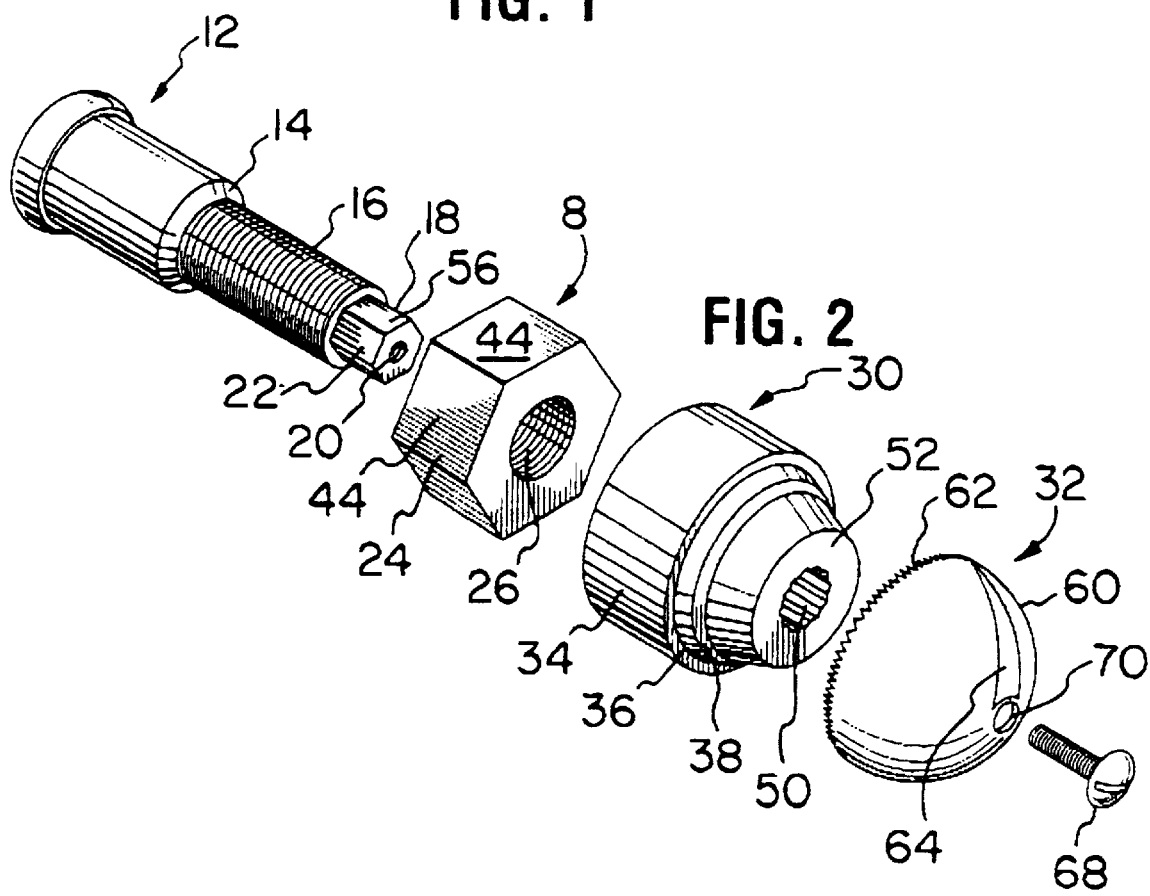
FIG. 2 is an exploded view of a preferred embodiment of the present invention.

With reference to FIG. 2, the stud or bolt 12 of the hub assembly has a shaft 14 which comprises a threaded portion 16 in the usual manner and an extension 18 which has a threaded aperture 20 therein and has a polygonal outer surface 22. The nut 8 is of conventional construction having a polygonal outer surface 24 and a threaded inner surface 26.

Figure 3:
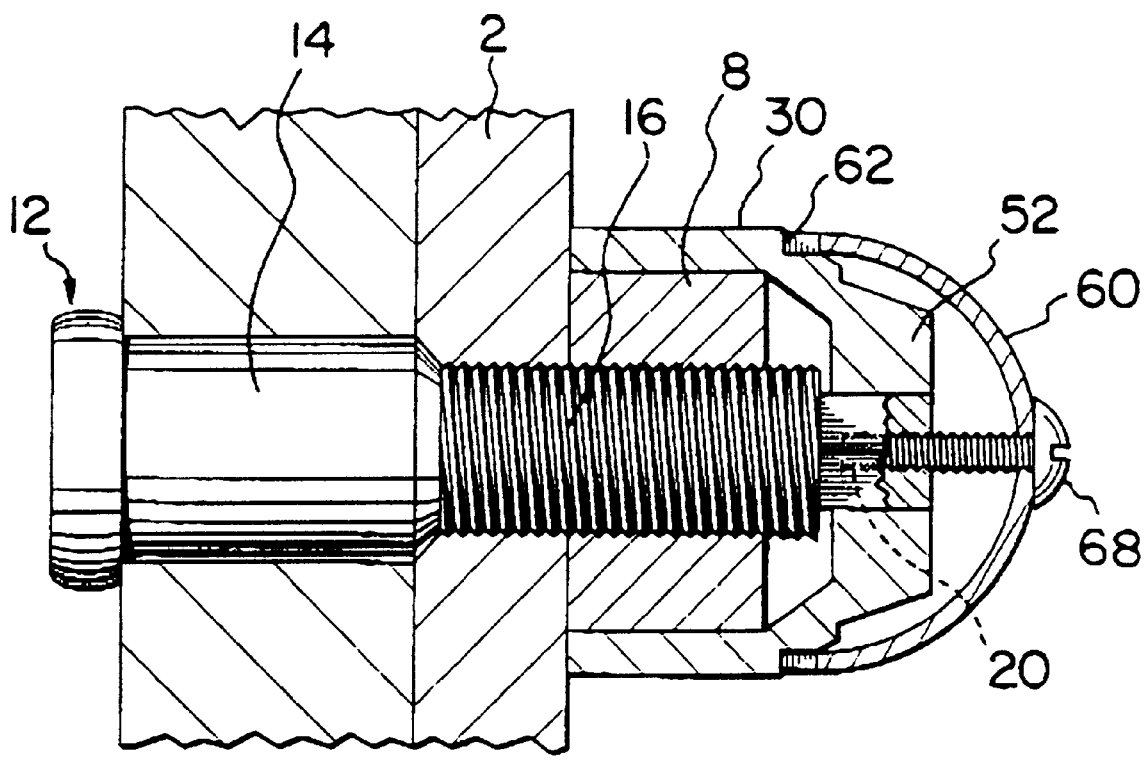
FIG. 3 is a cross-section view of the assembly of the present invention.
Figure 4:
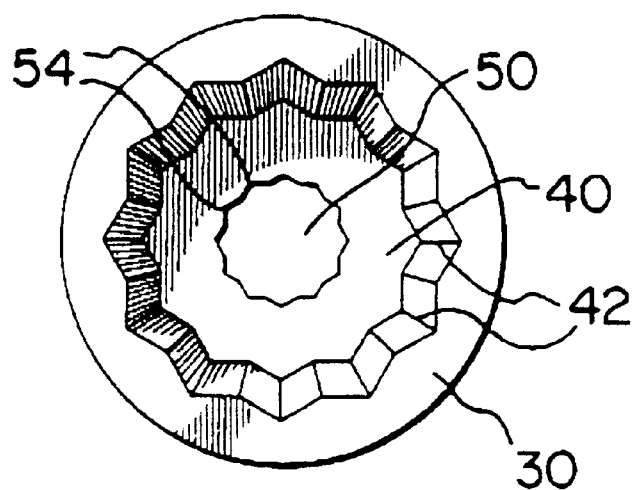
FIG. 4 is a rear elevation of the locking cap of the present invention.

With reference to FIGS. 2 to 4, the locking assembly 10 comprises a locking cap 30 and an indicator means 32. The locking cap 30 is shown to comprise a stepped outer surface 34 such that the steps form a first groove 36 and a second groove 38. Otherwise, the outer surface 34 of the locking cap 30 is preferably, although not essentially, round as illustrated.

The locking cap further comprises a recess 40 which comprises a plurality of internal grooves 42 which are adapted to receive the polygonal outer surface 24 of the nut 8 in a rotationally locked arrangement relative to the shaft 14. The number of grooves 42 is preferably chosen to be twice the number of sides 44 on the outer surface 24 of the nut 8. Thus, in the embodiment illustrated, there are 12 grooves 42 in the recess 40 to mate with the 6 sides 44 of the nut 8. In this manner, the recess 40 of the locking cap 30 may engage the outer surface 24 of the nut 8 in any one of a plurality of rotational orientations and still be positioned to lock the nut 8 in place relative to the stud 12.

The locking cap 30 is also provided with an aperture 50 in a top portion 52 thereof. The aperture 50 is adapted to receive the polygonal outer surface 22 of the head extension 18 so as to prevent rotation of the locking cap 30 and the wheel nut 8 relative to the shaft 14. The aperture 50 comprises a plurality of grooves 54 which, in operation, receive and engage the polygonal outer surface 22 of the head extension 18. As with the number of grooves 42 in the recess 40, the number of grooves 54 in aperture 50 is preferably chosen to be twice the number of sides 56 on the polygonal outer surface 22 so that the aperture 50 may engage the extension 18 in any one of a plurality of rotational orientations and still prevent rotation of the locking cap 30 and the wheel nut 8 relative to the shaft 14.

As shown in FIGS. 2 and 3, the locking assembly 10 may further comprise indicator means 32 which comprises a hemispherical cap 60 constructed so that its end 62 abut the outer surface 34 of the locking cap 30, preferably in one of grooves 36 or 38. The two grooves 36 and 38 allow for two diameters of cap 60 to be used so that a longer stud 12 can be accommodated within the locking assembly 10. The end 62 of the cap 60 may be serrated as shown to strengthen the engagement of the indicator means 32 against the locking cap 30. The hemispherical shape of cap 60, along with the different diameters if needed, allows for the stud 12 to be of varying lengths without interfering with the cap 30. Thus, the nut 8 can be locked in a number of positions without requiring any shims or the like. This in turn allows for different thicknesses of wheel rims to be accommodated.

There is also provided an indicating device, illustrated as a radial marking 64 on the outside surface 66 of the cap 60. The marking 64 is preferably made of reflective material so that it is readily visible to the vehicle operator, even at night. The marking 64 on the various caps 60 of the wheel 2 are all preferably arranged in a pattern, for example all pointing downwards as illustrated in FIG. 1 so that if any one of the studs 12 should break or if any of the nuts 8 should work loose, the marking 64 would be misaligned relative to the markings on the other assemblies thus indicating a potential problem to be investigated.

The cap 60 is secured in place in the assembly 10 by means of a fastener 68 passing through an aperture 70 to threadably engage the threaded aperture 20 in the extension 18. The fastener is chosen to be vibration and shock resistant and is therefore preferably of the nylock type.

In use, therefor, the locking assembly 10 is placed over the nut 8, which itself is in place on the stud 12. The grooves 42 of recess 40 of the locking cap 30 engage the sides 44 of the nut 8 and the grooves 54 in the aperture 50 of the locking cap 30 engage the sides 56 of the head extension 18 so as to positively lock the nut 8 and the cap 30 in two places and prevent rotation of the locking cap 30 and the wheel nut 8 relative to the shaft 14. The indicator means 32 on the various hub assemblies are then aligned so that all of the marking devices 64 are aligned. Thus, there is provided a two position positive lock on the wheel nut 8 and a readily visible manner of verifying that the wheel 2 is firmly held in place and unlikely to come loose from the vehicle.

Thus, it is apparent that there has been provided in accordance with the invention a wheel nut locking assembly that fully satisfies the objects, aims and advantages set forth above. While the invention has been described in conjunction with illustrated embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

The embodiments of the invention in which an exclusive property or privilege is claimed are defined as follows:

What I/we claim as my/our invention:

1. A wheel nut locking assembly for use on a wheel nut on a hub of a vehicle wheel, wherein said wheel nut comprises a polygonal outer surface and a threaded inner-surface constructed so as to engage a shaft having a threaded portion, and a non-threaded polygonal head extension with a threaded aperture therein, said assembly comprising:

a locking cap having a recess adapted to receive said wheel nut in one of a plurality of orientations in a rotationally locked arrangement relative to said shaft and an aperture adapted to receive and engage said polygonal head extension so as to prevent rotation of said locking cap and said wheel nut relative to said shaft, the locking cap having a plurality of concentric edge receiving grooves of reducing diameters on a conical outer side surface thereof, each of said grooves adapted to receive a bottom edge of a hemispherical cap which covers the top of the locking cap and a portion of the side of the locking cap; and indicator means to signal movement of said shaft relative to the hub, said indicator means constructed so as to be abutting and be releasably lockable to said locking cap.

2. The assembly of claim 1 wherein said recess comprises a plurality of internal grooves to receive said polygonal outer surface of said nut in said rotationally locked arrangement.

3. The assembly of claim 2 wherein the number of internal grooves in said recess is double the number of sides on said polygonal outer surface of said nut.

4. The assembly of claim 1 wherein said aperture comprises a plurality of internal grooves to receive and engage said polygonal head extension of said shaft so as to prevent rotation of said locking cap and said wheel nut relative to said shaft.

5. The assembly of claim 4 wherein the number of internal grooves in said aperture is double the number of sides on said polygonal head extension.

6. The assembly of claim 1 wherein said indicator means comprises an indicating device on the hemispherical cap readily visible to a user of said assembly and constructed so as to abut said locking cap and releasably engage said locking cap and said shaft.

7. The assembly of claim 6 wherein said hemispherical cap is provided with serrations along its circumferential bottom edge, the serrations constructed so as to releasably engage an outer surface of said locking cap.

8. The assembly of claim 6 wherein said indicator means further comprises an aperture in said hemispherical cap and a fastener to threadably engage said threaded aperture in said polygonal head extension so as to releasably lock said indicator means relative to said locking cap.

9. The assembly of claim 8 wherein said fastener is selected so as to be shock and vibration resistant.

10. The assembly of claim 6 wherein said indicating device comprises a radial marking on an outside surface of said hemispherical cap wherein in use, said radial marking is adapted to cooperate with radial markings on corresponding locking assemblies on other wheels on the vehicle so as to visually align all of said locking assemblies.

* * * * *

UNITED STATES PATENT AND TRADEMARK OFFICE
CERTIFICATE OF CORRECTION

PATENT NO. : 6,053,681
DATED : April 25, 2000
INVENTOR(S) : Dennis Mottershead

It is certified that error appears in the above-indentified patent and that said Letters Patent is hereby corrected as shown below:

Title Page, Item[19] delete "Mattershead" and insert
--Mottershead--; and in heading [76] delete "Alta" and insert --Alberfa--.

Signed and Sealed this

Twenty-seventh Day of February, 2001

Attest:

NICHOLAS P. GODICI

*Attesting Officer*     *Acting Director of the United States Patent and Trademark Office*